United States Patent [19]
Thorsell

[11] 3,756,619
[45] Sept. 4, 1973

[54] ADJUSTABLE WHEEL SUSPENSION UNITS FOR VEHICLES
[75] Inventor: Roland H. Thorsell, Corvallis, Oreg.
[73] Assignee: Speed Cut, Inc., Corvallis, Oreg.
[22] Filed: June 8, 1971
[21] Appl. No.: 151,061

[52] U.S. Cl. ................................ 280/104, 280/81
[51] Int. Cl. ............................................ B60g 1/00
[58] Field of Search ................. 280/104, 104.5 R, 280/43.13, 43.17, 43.2, 43.22, 81 R, 9

[56] References Cited
UNITED STATES PATENTS

| | | | |
|---|---|---|---|
| 1,940,914 | 12/1933 | Marcum | 280/104.5 R |
| 2,614,863 | 10/1952 | Schramm | 280/104.5 R |
| 3,105,700 | 10/1963 | Hardman | 280/104.5 R |
| 3,165,331 | 1/1965 | Hardman | 280/81 R |

Primary Examiner—Philip Goodman
Attorney—Kimmel, Crowell & Weaver

[57] ABSTRACT

Vehicular wheel suspension units consist of primary support frames upon which plural tandem wheel assemblies are suspended through trailing pivotal link arms. Additional interconnecting linkage means between the several independently suspended wheel assemblies allow the assemblies to operate in unison on rough terrain in a compensating mode to maintain a level and smooth shock-free ride with maximum roll stability. The system is purely mechanical without resort to cables, hydraulics or pneumatics. The wheel suspension is adjustable to raise or lower the vehicle main frame or bed and to lock it at a desired elevation in a safe manner while the vehicle is at rest. The system is applicable to trailers and other vehicles.

9 Claims, 8 Drawing Figures

PATENTED SEP 4 1973 3,756,619

INVENTOR
ROLAND H. THORSELL

BY Kimmel Crowell & Weaver
ATTORNEYS

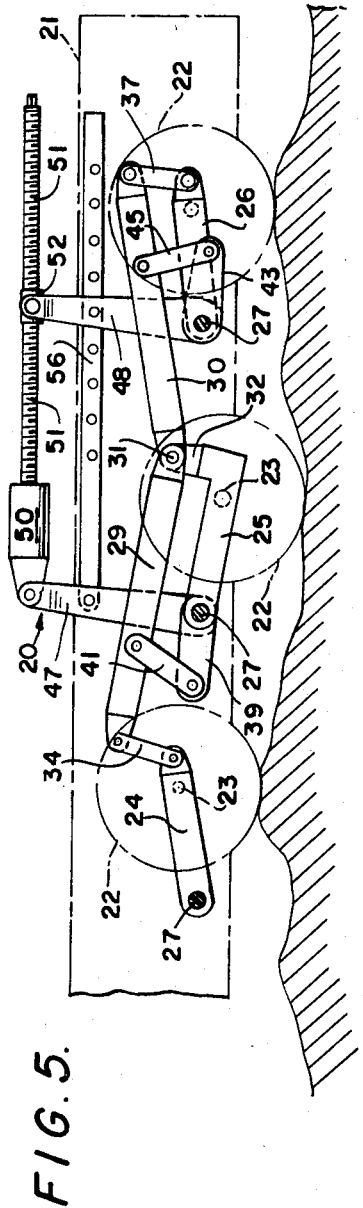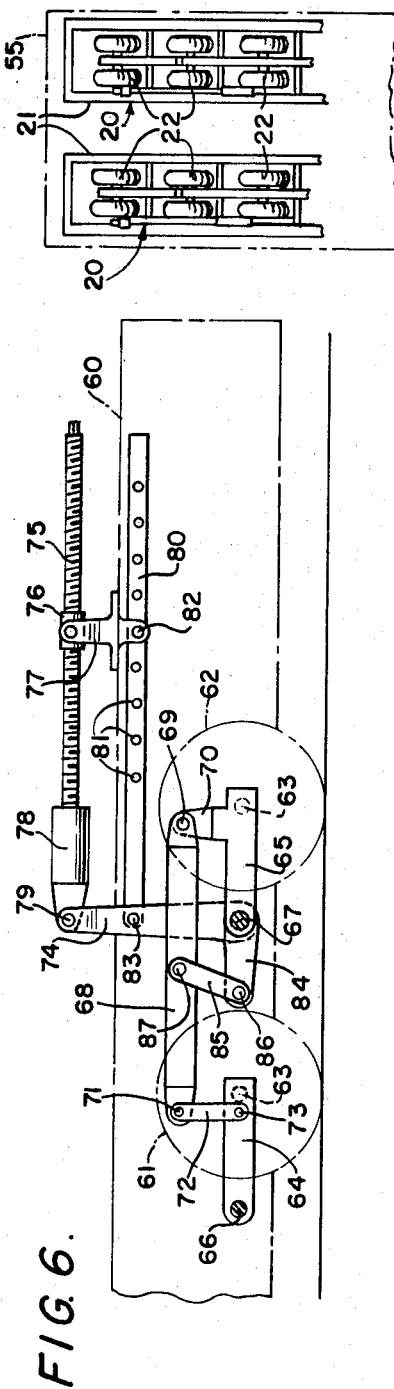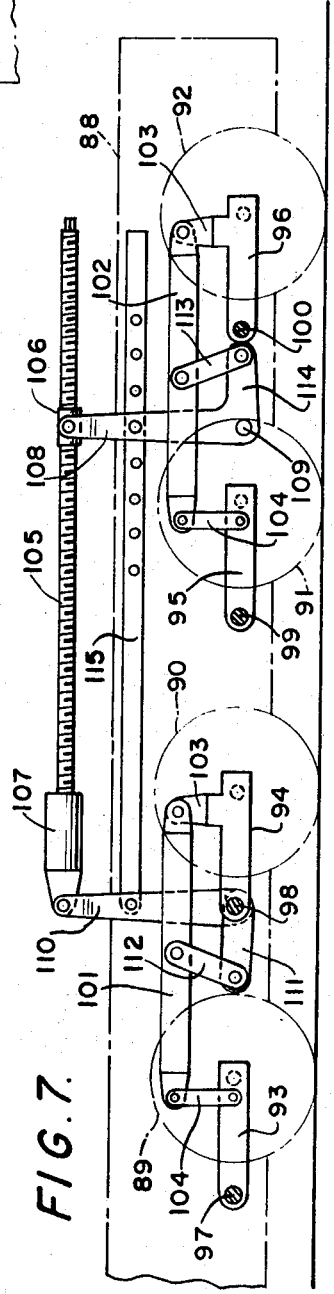

ADJUSTABLE WHEEL SUSPENSION UNITS FOR VEHICLES

Many wheel suspension arrangements for vehicles are known in the prior art including some systems which have for their objective the attainment of a smooth and level shock-free ride. Some such suspensions include means for raising and lowering the wheels relative to the vehicle frame. Some such prior art devices are unduly complicated and costly and some include cable components and/or hydraulics or pneumatics components which have been known to fail during operation and are frequently subject to leakage. Steel cables gradually deteriorate with use due to fatigue and abrasion and cable size is a limiting factor since sheaves must fit into relatively small available spaces.

With the above prior art factors in view, the objective of this invention is to provide an improved vehicular suspension which is wholly mechanical in construction and operation, extremely reliable, highly simplified, and very strong, the structures involved requiring little attention beyond routine lubrication. Rigid components are employed throughout the system without resort to flexible connectors, hydraulics or pneumatics. The suspension means has the ability to move over rough terrain with stability while maintaining a level, relatively shock-free and smooth ride. The invention is particularly applicable to trailers, semi-trailers and other vehicles which haul delicate articles. By means of a simple adjustment, the bed or frame of the vehicle may be raised or lowered. In fact, each side of the vehicle may be adjusted in this respect independently of the other side as when aligning the vehicle bed with a loading dock in a precise manner.

Other features and advantages of the invention will be apparent to those skilled in the art during the course of the following detailed description.

BRIEF DESCRIPTION OF DRAWING FIGURES

FIG. 5 is a further side elevation of the unit showing the action of the wheel assemblies when moving over rough terrain.

FIG. 6 is a similar view showing a modification of the invention where a pair only of the wheel assemblies are employed.

FIG. 7 is a similar view showing a further modification embodying dual wheel assemblies each consisting of two pairs.

FIG. 8 is a reduced size fragmentary plan view showing a pair of the suspension units as employed at the opposite sides of a vehicular frame or bed.

DETAILED DESCRIPTION

Figure 1:
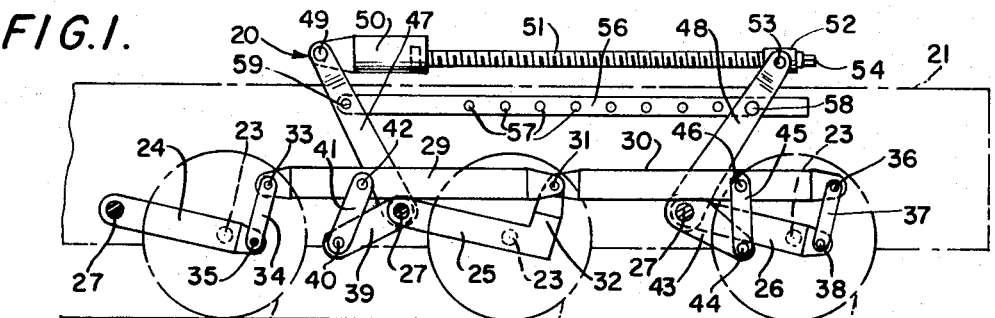
FIG. 1 is a partly diagrammatic fragmentary side elevation of an adjustable wheel suspension unit for vehicles embodying the invention.
Figure 2:
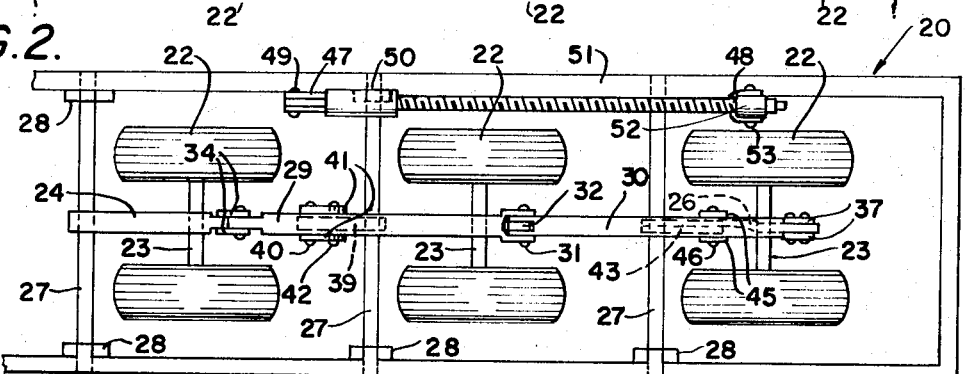
FIG. 2 is a top plan view of the unit.

Referring to the drawings in detail wherein like numerals designate like parts, and referring first to FIGS. 1 through 5 and 8, the numeral 20 designates one of an identical pair of vehicular wheel suspension units embodying the invention. FIG. 8 illustrates diagrammatically the use of a pair of the invention units in conjunction with a truck or trailer or like vehicle. A complete detailed description of one of the units 20 will effectively describe both units since they are identical.

Each unit 20 comprises a primary support frame 21 for a plurality of tandem wheel assemblies 22 each having a pair of wheels mounted on a short transverse axle 23. Each wheel assembly 22 is independently suspended from the support frame 21 by a single longitudinal trailing link arm 24, 25 and 26. Each trailing link arm has its forward end pivotally connected freely with a transverse horizontal shaft or axle 27 extending between the opposite sides of rigid frame 21 and suitably journaled thereon by a bearing means 28 of any preferred type. By this means, the individual wheel assemblies 22 are able to rise and fall independently of one another as the trailing link arms supporting them pivot vertically on the axes of shafts 27.

The several wheel assemblies of each unit 20, preferably three in number as shown, are further interconnected by a control linkage which causes them to respond in a predetermined manner during passage over irregular terrain, in order to exert a continual stabilizing and leveling effect on the support frame 21 of the particular unit and on the main frame of the particular vehicle to which a pair of the units 20 are attached. This control linkage comprises a pair of center longitudinal tie bars 29 and 30 in the embodiment shown, the bifurcated interior ends of which are pivotally connected at 31 to a short upright extension 32 on the trailing link arm 25 carrying the intermediate wheel assembly 22. The extension 32 is disposed rearwardly of the axle 23 of intermediate wheel assembly 22.

The forward end of tie bar 29 is pivoted at 33 to a pair of short connector links 34 whose lower ends are pivotally connected at 35 to the rear end of trailing link arm 24. Similarly, the rear end of tie bar 30 is pivotally connected at 36 to the tops of short connector links 37, whose lower ends are pivotally connected at 38 to the rear end of trailing link arm 26.

A relatively short crank arm 39 rigidly secured to the intermediate shaft 27 beneath the tie bar 29 has its forward end pivoted at 40 to connector links 41 which in turn have their upper ends pivoted at 42 to the opposite sides of tie bar 29 somewhat rearwardly of the forward end thereof. A rearwardly facing crank arm 43 rigid with the rearmost shaft 27 and disposed beneath the rear tie bar 30 has its trailing end pivotally secured at 44 to connector links 45 whose upper ends are pivoted at 46 to the tie bar 30 somewhat forwardly of its rear end.

In order to adjust the height of each unit frame 21 while the vehicle is at rest, a pair of relatively long crank arms 47 and 48 have their lower ends rigidly secured to the intermediate and rear transverse shafts 27 close to one side of the frame 21. The top end of arm 47 is pivoted at 49 to a connector 50 having swiveled engagement with the forward end of a screw shaft 51, whose rear end engages through a nut 52, swiveled at 53 to the upper end of arm 48. The rear end of screw shaft 51 may have a square head 54 for engagement by a crank or wrench for turning the shaft to adjust the height of the unit frame 21 relative to the wheel assemblies and the ground.

Figure 3:
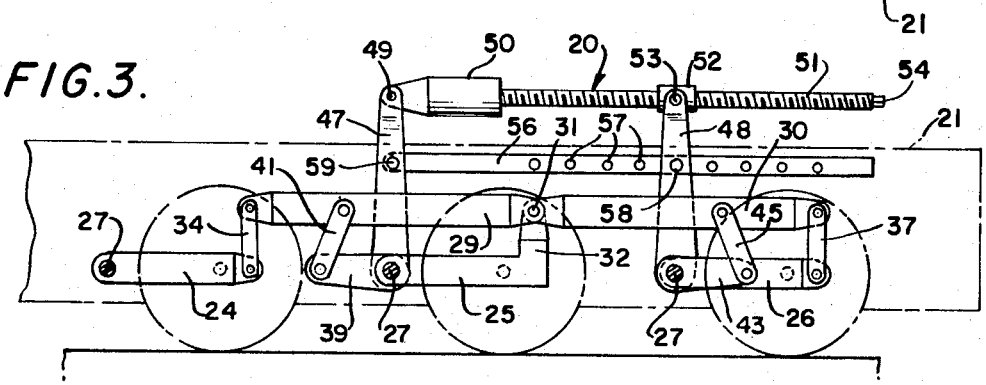
FIG. 3 is another side elevation of the unit similar to FIG. 1 showing the unit frame adjusted to intermediate or normal height, FIG. 1 showing the frame elevated above the normal height.
Figure 4:
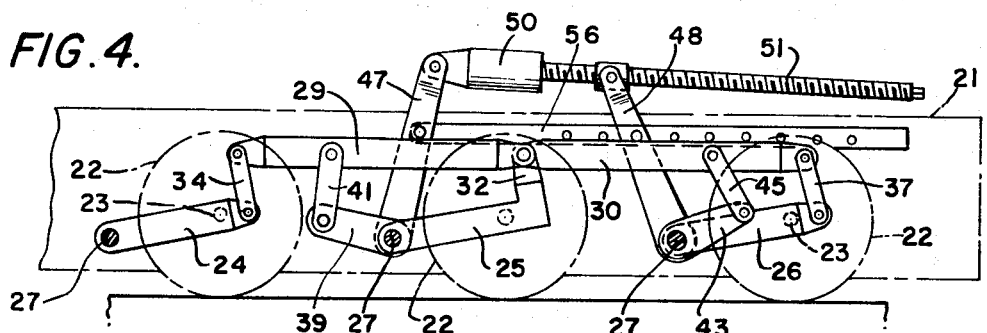
FIG. 4 is a similar view showing the unit frame in a lowered position relative to the wheel assemblies.

By reference to FIGS. 3, 4 and 1, it may be easily seen that turning the shaft 51 in one direction will cause the tops of the two crank arms 47 and 48 to move together for lowering the frame 21, while opposite turning of the shaft 51 will separate the tops of the arms 47 and 48 and elevate the frame 21. FIG. 3 shows a normal or optimum frame elevation while FIG. 1 shows the frame 21 at its maximum height and FIG. 4 shows it at or near its minimum height. This adjustment is very useful when loading and unloading a trailer truck or the like at a shipping dock. The arrangement allows the bed of the vehicle to be accurately adjusted relative to the dock. Referring to FIG. 8 where the two coacting wheel suspension units 20 are shown, it will be understood that the heights of the two frames 21 may be independently adjusted in a situation where it is desired to tilt the bed of the vehicle. In FIG. 8, the vehicle bed or frame is shown diagrammatically by the numeral 55, and the two unit frames 21 are attached to the frame or bed of the vehicle in any conventional manner.

Means are provided to safely lock the frame height adjusting means of each unit 20 in the selected adjusted position. This means comprises a rigid bar 56 having uniformly spaced openings 57 therein for the selective reception of a locking bolt 58 engaging through an opening in the crank arm 48. The other end of the bar 56 may be pinned to the arm 47 at 59. When the screw shaft 51 is utilized to adjust the height of the frame 21, the bolt 58 is inserted through the nearest opening 57 to positively lock the mechanism against further movement. This locked condition prevails when the vehicle is in motion on the roadway, and adjustment of height takes place when the vehicle is at rest. This locking and adjustment mechanism does not interfere with the free articulation of the wheel assemblies 22 while passing over rough terrain or the free movement of the associated control linkage. As can be seen in FIGS. 1, 3 and 4, adjustment of the two arms 47 and 48 by means of screw shaft 51 causes these arms to turn the two associated shafts 27 in their bearings and this in turn rotates the crank arms 39 and 43 which are rigid with the shafts 27 and through the associated linkages the frame 21 is raised or lowered.

During movement over rough terrain, FIG. 5, it may be noted that the independently mounted wheel assemblies 22 may rise and fall independently to maintain the frame 21 substantially level and free of shocks and lateral roll. The interconnecting linkage between the plural wheel assemblies functions automatically to maintain an even distribution of weight among the plural wheel assemblies and consequently the stability of the vehicle. The linking together of the three assemblies is essential to distributing weight among them and the nature of the linkage is such that it does not interfere with the free rise and fall of the several units independently, as dictated by the contour of the terrain.

While FIG. 8 depicts a pair of the wheel suspension units 20 at the opposite sides of a vehicle, it should be recognized that more than two units could be employed in some instances depending upon the overall width of the vehicle and the load to be supported. In some cases, a pair of dual wheels or a total of four could be mounted on the axles 23.

FIG. 6 shows a modification of the invention wherein a primary support frame 60 is carried adjustably by a carriage having two wheel assemblies 61 and 62 instead of three as depicted previously. In this invention form, the axles 63 of wheel assemblies 61 and 62 are carried by vertically swingable trailing link arms 64 and 65, pivotally suspended from axles 66 and 67 journaled on the sides of frame 60. A longitudinal tie bar 68 has its rear end pivoted at 69 to an upstanding short extension 70 near the rear end of link arm 65 and rigid therewith. The forward end of tie bar 68 is pivoted at 71 to a link or links 72 whose lower ends are pivoted at 73 to the trailing link arm 64.

A crank arm 74 rigid with shaft 67 turns this shaft in response to turning of an adjusting screw shaft 75 to regulate the height of the frame 60. The shaft 75 has threaded engagement with a nut 76 swiveled to a bracket 77. The leading end of the screw shaft has swiveled connection with connector 78 pivoted at 79 to the arm 74. A locking bar 80 having spaced openings 81 receives a bolt 82 on the bracket 77 to lock the mechanism with the frame 60 at the desired height. The forward end of the bar 80 is pivoted to the arm 74 as at 83. A short crank arm 84 rigid with the rotary shaft 67 projects forwardly therefrom and responds to movements of the arm 74. A connector link 85 is pivoted to crank arm 84 and tie bar 68 at 86 and 87 and through this connector link the mechanism adjusts to raise and lower the frame 60 in response to turning of the screw shaft 75.

During movement over rough terrain, the wheel assemblies 61 and 62 rise and fall independently but are linked together to maintain stability and weight distribution as in the prior invention form.

FIG. 7 depicts a further modification wherein the primary support frame 88 of the wheel suspension unit is carried by four independent assemblies linked together in two pairs of sub-units. The individual wheel assemblies 89, 90, 91 and 92 which may be like the assemblies 22 are suspended from trailing link arms 93, 94, 95 and 96, in turn pivoted to and trailing from cross axles 97, 98, 99 and 100 on the frame 88. Separate tie bars 101 and 102 link the forward and rear pairs of wheel assemblies together by having their rear ends pivoted to extensions 103 of the arms 94 and 96 and their forward ends pivoted to connector links 104 which in turn are pivoted to the arms 93 and 95. The vertical adjustment and locking of the frame 88 is accomplished by means of a screw shaft 105, nut 106 and connector 107. The nut is swiveled to a crank arm 108 on a fixed pivot 109 at one side of the frame 88 and the connector 107 is pivoted to the top of a second crank arm 110 near the same side of the frame and rigid with the shaft 98. A short crank arm 111 on the shaft 98 turns therewith in response to movement of arm 110 and through a connector link 112 raises and lowers the frame 88. In a similar manner, the rear portion of the frame 88 is raised and lowered by turning of the arm 108 on pivot 109 through a connector link 113 which is attached to a rigid extension 114 on the crank arm 108 generally at right angles thereto. The frame 88 is releasably locked at selected elevations through a locking bar 115 substantially in the manner already described.

During movement on rough terrain, the forward pair of wheel assemblies 89 and 90 can rise and fall independently on their trailing links 93 and 94 and these two assemblies being connected through a control linkage including elements 101, 103 and 104 automatically distribute weight and maintain stability. The rear two wheel assemblies 91 and 92 in a like manner rise and fall independently and maintain weight distribution. The particular type of suspension unit such as three wheel assemblies, two or four, will be dictated by the type or size of vehicle and its loading.

In connection with all embodiments of the invention, there is the common unique feature of an interconnecting control linkage between adjacent wheel assemblies which are suspended from the vertically swingable trailing link arms. The arrangement renders the use of springs unnecessary and causes each separate wheel assembly in the group to exert a resistive and controlling influence on adjacent assemblies during passage over rough terrain. The load of the vehicle is borne evenly by the several tandem wheel assemblies and when rough terrain causes rising of a particular wheel assembly the control linkage acting under load distributes the load and the shock to adjacent assemblies automatically. Therefore, the total suspension unit while highly flexible in its operation is completely controlled in its movements without springs. The resultant ride is stable, virtually shock-free and smooth and level.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A vehicle wheel suspension unit comprising a primary support frame, plural wheel assemblies forming the totality of wheel assemblies carrying said frame in spaced tandem relation, a transverse shaft in advance of each of the wheel assemblies on said frame, a vertically swingable trailing link arm mounted on each of said shafts and extending rearwardly of its associated shaft, each of said wheel assemblies having a transverse axle that is secured to a tracking link arm rearwardly of its associated shaft, at least one longitudinal tie bar extending between an adjacent pair of the wheel assemblies and having a connection with one trailing link arm, a first connector link between said tie bar and the trailing link of another wheel assembly, whereby the wheel assemblies may rise and fall independently while automatically distributing the vehicle weight thereon approximately equally, at least one first crank arm mounted to at least one of said transverse shafts, a second connector link between said first crank arm and said tie bar, and adjustable means for swinging the first crank arm about the axis of its associated transverse shaft to thereby raise and lower said support frame relative to said wheel assemblies.

2. The structure of claim 1, and said plural wheel assemblies comprising three separate assemblies in tandem relation, and said at least one longitudinal tie bar comprising a pair of longitudinal tie bars having interior ends pivotally connected with the trailing link arm of the intermediate wheel assembly and having exterior ends that are each pivotally connected with a first connector link, said first connector links leading to and being connected with the trailing link arms of the forward and rear wheel assemblies.

3. The structure of claim 2, and a pair of said first crank arms rigidly attached to a pair of said transverse shafts, and wherein said adjustable means comprises second crank arms rigid with said shafts, a pair of said second connection links interconnecting the first crank arms and said tie bars on opposite sides of the intermediate wheel assembly, and screw adjustor means connected with the second crank arms to swing the same upon the axes of said pair of shafts for raising or lowering the frame.

4. The structure of claim 3, and means to positively lock the second pair of crank arms in selected adjusted positions.

5. The structure of claim 4, and said means to positively lock said crank arms comprising a rigid bar having a connection with one crank arm and having spaced openings for selectively receiving a pin-like locking element on the other crank arm.

6. The structure of claim 3, and said screw adjustor means comprising a screw shaft, a connector having a swiveled connection with the screw shaft and attached to one crank arm, and a nut on the screw shaft having a swiveled connection with the other crank arm.

7. The structure of claim 1 and said plural wheel assemblies comprising a pair of said assemblies, a single tie bar having one end directly connected to the trailing link arm of one assembly, a first connector link between the other end of the tie bar and the trailing link arm of the other wheel assembly, a crank structure comprised of said first crank arm rigidly secured to the transverse shaft in advance of said one wheel assembly, a second connector link between the crank structure and said tie bar, and wherein said adjustable means pivots said crank structure around the axis of the transverse shaft to raise and lower said frame.

8. The structure of claim 1, and said plural wheel assemblies comprising four separate assemblies arranged in two pairs, control linkage means comprised of said first connector link and said tie bar for the wheel assemblies of each pair so that each assembly in each pair exerts a controlling force on the other assembly of that pair when the vehicle is moving over rough terrain to thereby distribute the weight of the vehicle substantially evenly, and said adjustable means comprises adjustable mechanical linkage means comprised of said first crank arm having a connection with the control linkage means of each pair of wheel assemblies.

9. The structure of claim 8, and said adjustable linkage means including a screw-threaded member common to said control linkage means of both pairs of wheel assemblies.

* * * * *

PO-1050
(5/69)

UNITED STATES PATENT OFFICE
CERTIFICATE OF CORRECTION

Patent No. 3,756,619  Dated September 4, 1973

Inventor(s) Roland H. Thorsell

It is certified that error appears in the above-identified patent and that said Letters Patent are hereby corrected as shown below:

In the Specification:
   Column 3, line 67, the word "axles" should be --shafts--;
   Column 4, line 36, the word "axles" should be --shafts--.

In the Claims:
   Column 5, line 35 (Claim 1, line 9), the word "tracking" should be --trailing--.

Signed and sealed this 27th day of November 1973.

(SEAL)
Attest:

EDWARD M. FLETCHER, JR.
Attesting Officer

RENE D. TEGTMEYER
Acting Commissioner of Patents